United States Patent [19]

Ruijgrok et al.

[11] Patent Number: 4,484,252
[45] Date of Patent: Nov. 20, 1984

[54] PULSED IN ETCHING OF ALUMINUM FOIL FOR USE IN ELECTROLYTIC CAPACITORS

[75] Inventors: Rudolphus P. T. Ruijgrok, Eindhoven; Gerrit Tempelman, Zwolle, both of Netherlands

[73] Assignee: U.S. Philips Corporation, N.Y.

[21] Appl. No.: 328,874

[22] Filed: Dec. 9, 1981

[30] Foreign Application Priority Data

Dec. 23, 1980 [NL] Netherlands .......................... 8006998

[51] Int. Cl.³ .................... H01G 9/00; H01G 9/04; H01G 9/24; C22C 21/00
[52] U.S. Cl. ........................ 361/433; 29/570; 204/129.43
[58] Field of Search .............. 361/433; 204/129.43, 204/DIG. 9; 29/570

[56] References Cited

U.S. PATENT DOCUMENTS 3,997,339 12/1976 Fickelscher .................... 361/433 X Primary Examiner—Michael L. Gellner
Assistant Examiner—Douglas S. Lee
Attorney, Agent, or Firm—Norman N. Spain

[57] ABSTRACT

Low-voltage aluminium foil for electrolytic capacitors having an enlarged effective surface, characterized by narrow long channels which repeatedly change their directions. The overall length of the channels, which have a diameter of approximately 0.2 micron is more than 5 microns. The zones on both sides of the foil, which zones have been provided with channels, extend to substantially equal depth over the entire surface, a zone of at least 15 microns in the middle of the cross-section being of compact aluminium. This foil can be obtained by means of pulsed direct current etching.

3 Claims, 3 Drawing Figures

PULSED IN ETCHING OF ALUMINUM FOIL FOR USE IN ELECTROLYTIC CAPACITORS

BACKGROUND OF THE INVENTION

The invention relates to aluminum foil having an enlarged effective surface for use in electrolytic capacitors, to a method of producing foil having such an enlarged effective surface and to electrolytic capacitors at least one of the electrodes of which consists of this foil.

A distinction can be made between what is commonly referred to as a "high voltage foil", which is formed at a voltage above approximately 200 V, which results in a thick oxide layer, and a "low voltage foil" which is formed at a voltage of not more than approximately 120 V, which results in a thin oxide layer. The desired structure of the zone of the foil below the surface is different for these classes of foil: for foils of the last-mentioned class the channel the foils of these two by means of which the effective surface is enlarged may be much narrower than those for the foils of the first-mentioned class. Channels having a diameter in the order of magnitude of the thickness of the oxide layer to be formed of course do not contribute to the capacitance. Consequently, a high-voltage foil must have a much rougher pore structure with wider channels than a low-voltage foil. It is therefore possible to obtain a much larger effective surface for foils of the last-mentioned class than for foil of the first-mentioned class.

The invention relates in particular to the "low-voltage foil".

U.S. Pat. No. 3,520,788 describes an etched high-voltage foil and a method of producing the same. This foil is of such a construction that it is provided with wide channels which extend to the middle of the foil depth, as a result of which the foil loses a substantial part of its strength compared with the unetched starting product.

The invention provides a low-voltage foil of aluminum having a value of the effective surface per unit volume of material removed higher than that previously realized.

SUMMARY OF THE INVENTION

According to the invention the aluminum foil for electrolytic capacitors which has an enlarged effective surface due to the provision of channels opening at the surface, is characterized in that the channels have an average diameter of 0.2 $\mu$m and repeatedly, after a distance of less than approximately 1 $\mu$m change their direction, while the overall length of a channel is on an average more than 5 $\mu$m and that the zones on either side of the foil which are provided with said channels extend to a substantially equal depth over the entire surface so that a zone of not less than 15 $\mu$m thick extending along the middle of the foil cross-section remains free of channels, the foil having a product of CV of more than 1000 $\mu$F Volt after forming.

This structure, which provides surprisingly large effective surfaces can be easily recognized by means of a microscope and can be distinguished from etched structures which have been obtained so far.

A measure of the quality of the foil as regards the size of the effective surface is the capacitance per cm$^2$ after forming, i.e. the formation of a dielectric oxide skin by anodic oxidation.

The capacitance as a function of the quantity of aluminum which is removed by etching is of special importance. This last-mentioned quantity ($d_s$) per cm$^2$ can be easily calculated from the loss of weight of the foil before and after etching.

It is also important that the effective surface of the cathode foil be of the same order of magnitude as that of the anodic foil as only in that case is not more than 45 $\mu$F/cm$^2$.

Figure 1:
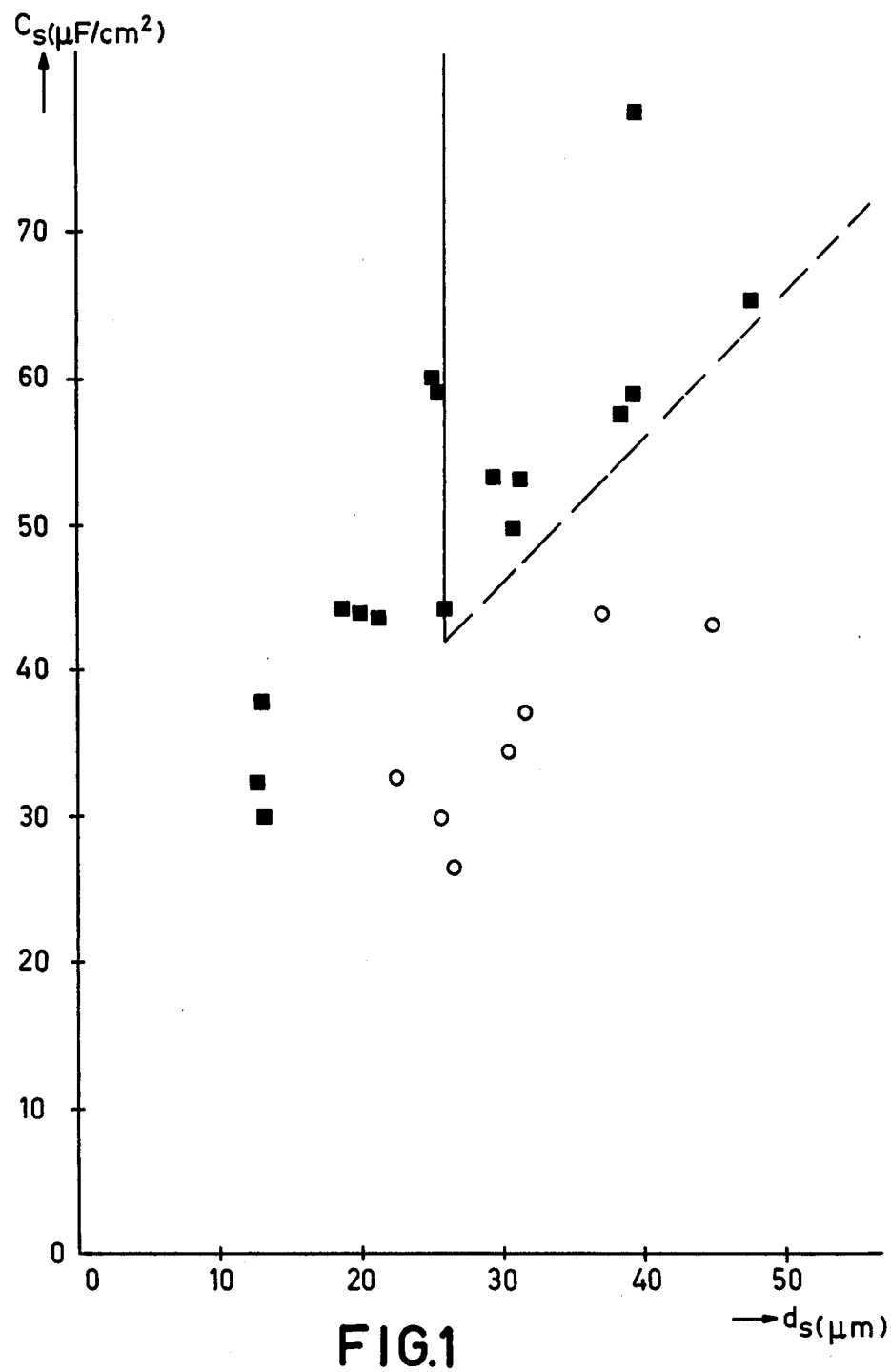
FIG. 1 is a graph showing the relationship of the capacitance $C_s$ and the pore volume C or volume of aluminum reduced per cm$^2$ per surface unit of known foils and foils prepared in accordance with the method of the invention.

The accompanying graph (FIG. 1) shows the capacitance $C_s$ of formed foil having an enlarged effective surface etched in accordance with the invention as a function of $d_s$ the pore volume (or volume of aluminum removed) per cm$^2$ per surface unit compared with some known foils.

The forming process was carried out in a 2% solution of ammonium pentaborate in water, the forming voltage first being increased from zero at a constant rate of 0.01 V/s to a value of 20 V and then being kept at this voltage, until the current has decreased to 20% of the initial value at 20 V.

The capacitance was measured at 100 Hz, also in a solution of 2% ammonium pentaborate in water.

The values measured for the foil in etched accordance with the invention are shown by means of squares and the values measured for some prior art foils are shown by means of circles.

As shown in the graph the foil etched in accordance with the invention has a capacitance per cm$^2$ of at least 59 $\mu$F/cm$^2$, at a value $d_s$ of 50 $\mu$m (and after forming with 20 V), while in the same circumstances the prior art foil had a capacitance value of not more than 45 $\mu$F/cm$^2$.

Figure 2:
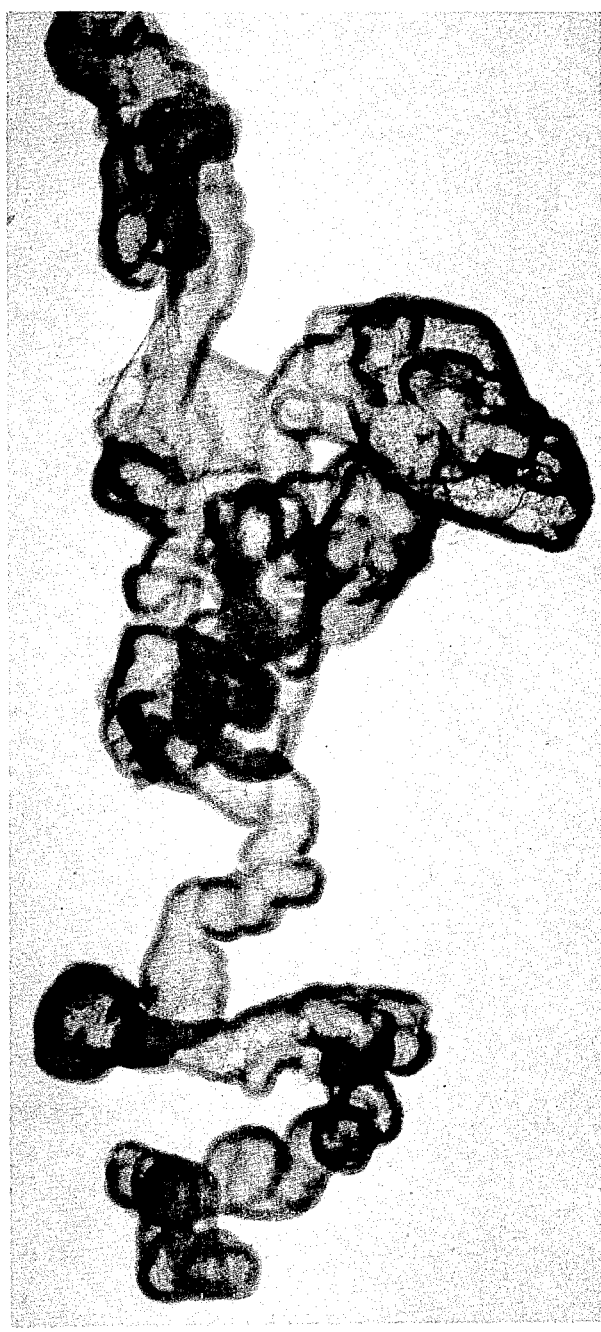
FIG. 2 is a photograph of an electromicroscopic image, magnified 2,000 times, of a typical pore profile of a foil etched in accordance with the invention
Figure 3:
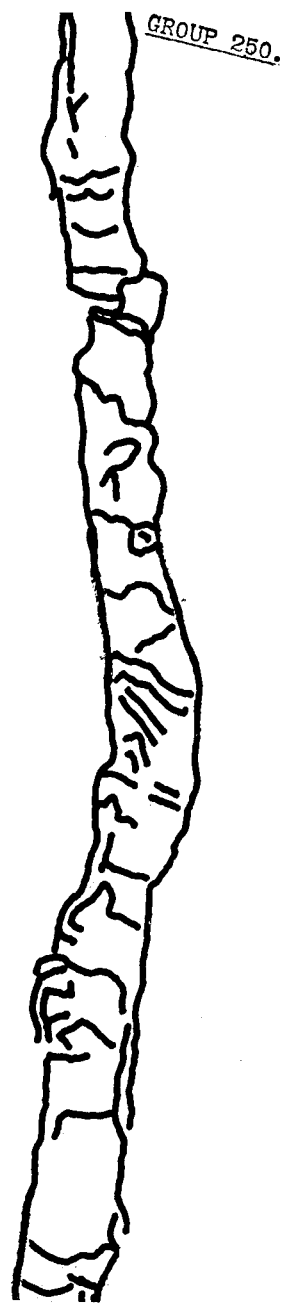
FIG. 3 is a photograph made under similar conditions of a typical pore profile of a commercially available foil.

FIGS. 2 and 3 are projections of typical pore profiles in accordance with the invention and of a commercially available foil, respectively, both magnified 72,000 times.

The photographs were made by means of a replica technique in transmission-electron microscopy. In carrying out this technique the pores in the etched foil are provided with an aluminum oxide layer by means of oxidation, or the pores are filled with a synthetic resin. Thereafter, the aluminum metal is removed by dissolving it. In the case where the synthetic resin is used carbon is deposited on the replica by means of vapour deposition and the synthetic resin is thereafter dissolved. Both photographs show isolated pores. FIG. 2 clearly shows that the pore continuously changes direction and has dimensions which are within the above-mentioned limits. An average straight distance of 40 channels was 0.63 $\mu$m$\pm$0.22 $\mu$m, the average diameter of 78 channels was 0.20 $\mu$m$\pm$0.06 $\mu$m.

FIG. 3 shows a straight channel, characteristic for a prior art etching process with direct current. When the dimension of straight pieces was measured an average straight distance of 2.7$\pm$0.5 $\mu$m and a cross-section of 0.18$\pm$0.05 $\mu$m were found.

The pore structure in accordance with the invention can be obtained by means of anodic etching in an electrolyte solution with a pulsed direct current having an interruption frequency of between 35 and 300 Hz and an interruption time between 500 and 2000 μsec, at a temperature between 60° and of 95° C., characterized in that the etching is carried out in an electrolyte solution containing a chloride and having a conductivity ($\delta$) of at least 100 mS/cm with an etching current density related to the direct current portion between 0.5 and 3 A/cm² for a period of time long enough for a loss in volume of aluminum for each cm² of foil surface ($d_s$) of at least 25 μm to be obtained.

The quantity of the aluminum loss can be easily ascertained by determining the loss in weight of the foil after etching.

By way of example there now follows a description of a method of producing foil in accordance with the invention.

Aluminum foil of a purity of 99.99% having a thickness of 100 μm is anodically etched in the following circumstances.

Electrolyte: A 25% solution of sodium chloride ($\delta$ = 250 mS/cm)
Temperature: 75° C.
Etching time: 53 sec.
Current density: 170 A/dm²
Interruption frequency: 100 Hz
Pulse width: 1000 μsec.
Pulse shape: rectangular
Pulse height: 105%. i.e. 1/20 of the positive part of the pulse height being negative.

The foil obtained had a value of $d_s$, i.e. the loss in volume of aluminum per cm² of foil surface, of 50 μm. An unetched core of 25 μm remains.

The structure of the foil obtained corresponds with a core structure as shown in FIG. 2 and with the above-described parameters.

After forming at 20 V in a 2% solution of ammonium-pentaborate in water a capacitance of 64.5 μF/cm² was measured.

A wound aluminum foil capacitor is produced in the conventional way, i.e. by winding an etched cathode-foil and etched and formed anode-foil with an interposed paperfoil, impregnating the wound body obtained in this way with an electrolyte liquid, consisting of ammonium pentaborate-glycol, building it in into an envelope and postforming. By using etched foil in accordance with the invention the dimensions of the envelope can be reduced by about 20% of the volume of a similar capacitor using a known anode foil.

What is claimed is:

1. Aluminum foil for electrolyte capacitors which has an enlarged effective surface due to the provision of channels opening at the surface, characterized in that the channels have an average diameter of 0.2 μm and repeatedly, after a distance of less than approximately 1 μm, change their direction while the overall length of a channel is on an average more than 5 μm and that the zones on either side of the foil, which are provided with said channels, extend to a substantially equal depth over the entire surface, so that a zone of not less than 15 μm thick in the middle of the foil cross-section remains free of channels, the foil having a value of $d_2$ = loss of volume of aluminum per square cm of at least 25 μm and a product of CV of more than 1000 μF Volt after forming.

2. A method of producing aluminum foil as claimed in claim 1, by means of anodic etching in an electrolyte solution with a pulsed direct current having a pulse repetition rate between 35 and 300 Hz and a pulse spacing between 500 and 2000 μsec at a temperature between 60° and 95° C., characterized in that the etching is carried out in an electrolyte solution containing a chloride and having a conductivity of at least 100 mS/cm with an etching current density, related to the direct current portion of between 0.5 and 3 A/dm² for such a long period of time that a loss in volume of each cm² foil surface ($d_s$) of at least 25 μm has been attained.

3. An electrolytic capacitor comprising an etched cathode foil, an etched and formed anode foil and an interposed electrolyte characterized in that the anode foil consists of the aluminum foil as claimed in claim 1 provided with a dielectric layer produced by forming at a voltage of not more than approximately 120 volts.

* * * * *

UNITED STATES PATENT AND TRADEMARK OFFICE
CERTIFICATE OF CORRECTION

PATENT NO. : 4,484,252

DATED : November 20, 1984

INVENTOR(S) : RUDOLPHUS P.T. RUIJGROK ET AL

It is certified that error appears in the above—identified patent and that said Letters Patent is hereby corrected as shown below:

In the Claims:

Column 4, Claim 1, Line 21

"$d_2$" should be --$d_s$--.

Signed and Sealed this

Twenty-eighth Day of May 1985

[SEAL]

Attest:

DONALD J. QUIGG

Attesting Officer     Acting Commissioner of Patents and Trademarks